US012612471B2

(12) United States Patent
Tsuji et al.

(10) Patent No.: US 12,612,471 B2
(45) Date of Patent: Apr. 28, 2026

(54) CATIONIC POLYMERIZATION INITIATOR

(71) Applicant: KIRIN HOLDINGS KABUSHIKI KAISHA, Tokyo (JP)

(72) Inventors: Toshikazu Tsuji, Tokyo (JP); Takashi Yamazaki, Tokyo (JP); Akiko Ogawa, Tokyo (JP)

(73) Assignee: KIRIN HOLDINGS KABUSHIKI KAISHA, Tokyo (JP)

( * ) Notice: Subject to any disclaimer, the term of this patent is extended or adjusted under 35 U.S.C. 154(b) by 831 days.

(21) Appl. No.: 17/774,273

(22) PCT Filed: Nov. 19, 2020

(86) PCT No.: PCT/JP2020/043151
§ 371 (c)(1),
(2) Date: May 4, 2022

(87) PCT Pub. No.: WO2021/100797
PCT Pub. Date: May 27, 2021

(65) Prior Publication Data

US 2022/0396644 A1 Dec. 15, 2022

(30) Foreign Application Priority Data

Nov. 20, 2019 (JP) ................................ 2019-209812

(51) Int. Cl.
*C08F 4/04* (2006.01)
*C07D 233/04* (2006.01)
*C08F 2/26* (2006.01)

(52) U.S. Cl.
CPC .................................... *C08F 2/26* (2013.01)

(58) Field of Classification Search
None
See application file for complete search history.

(56) References Cited

U.S. PATENT DOCUMENTS

| | | | | |
|---|---|---|---|---|
| 10,712,346 | B2 * | 7/2020 | Tsuji | C08F 297/00 |
| 11,891,494 | B2 * | 2/2024 | Tsuji | C08K 5/0058 |
| 2004/0259998 | A1 * | 12/2004 | Kim | C08F 2/44 524/445 |
| 2012/0322943 | A1 | 12/2012 | Siol et al. | |
| 2019/0137503 | A1 | 5/2019 | Tsuji et al. | |

FOREIGN PATENT DOCUMENTS

| | | | | |
|---|---|---|---|---|
| CN | 1498228 | A | 5/2004 | |
| CN | 108350479 | A | 7/2018 | |
| EP | 3348648 | A1 * | 7/2018 | A61K 9/5138 |
| JP | 2-261 | A | 1/1990 | |
| JP | 2001-187764 | A | 7/2001 | |
| JP | 2005-517064 | A | 6/2005 | |
| JP | 2019-65005 | A | 4/2019 | |
| KR | 2000-0070015 | A | 11/2000 | |
| KR | 10-2012-0095921 | A | 8/2012 | |
| KR | 10-2017-0099960 | A | 9/2017 | |
| KR | 10-2018-0040714 | A | 4/2018 | |
| WO | 98/30601 | A2 | 7/1998 | |
| WO | 03/066686 | A1 | 8/2003 | |
| WO | 2016/099555 | A1 | 6/2016 | |
| WO | 2017/043484 | A1 | 3/2017 | |
| WO | WO-2019208674 | A1 * | 10/2019 | A01N 25/10 |

OTHER PUBLICATIONS

Chinese Office Action dated Dec. 7, 2023 in Chinese Application No. 202080076677.7.
International Preliminary Report on Patentability, dated May 17, 2022, with a Translation of the Written Opinion of the International Searching Authority, in Application No. PCT/JP2020/043151.
Extended European Search Report dated Nov. 3, 2023 in European Application No. 20890556.2.
International Search Report for PCT/JP2020/043151 dated Jan. 12, 2021.
Written Opinion for PCT/JP2020/043151 dated Jan. 12, 2021.
Office Action issued Mar. 27, 2025 in Korean Patent Application No. 10-2022-7015148.
Communication dated Dec. 29, 2025 in Korean Application No. 10-2022-7015148.

* cited by examiner

*Primary Examiner* — Richard A. Huhn
(74) *Attorney, Agent, or Firm* — Sughrue Mion, PLLC

(57) ABSTRACT

Disclosed is a compound having a chemical structure ($X_f^-$ is a counter anion selected from the group consisting of $Cl^-$, $NO_3^-$, $Br^-$, $I^-$, $CH_3SO_3^-$ and $OH^-$) of the following general formula (I). By using this compound as a polymerization initiator, the amount of the aggregation formed in emulsion polymerization can be reduced.

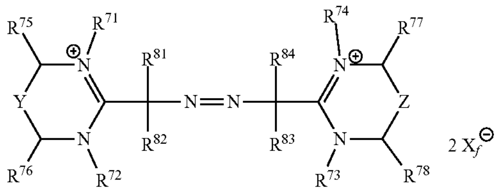

3 Claims, No Drawings

CATIONIC POLYMERIZATION INITIATOR

CROSS REFERENCE TO RELATED APPLICATIONS

This application is a National Stage of International Application No. PCT/JP2020/043151, filed Nov. 19, 2020, claiming priority based on Japanese Patent Application No. 2019-209812, filed Nov. 20, 2019. All disclosures in these prior applications are incorporated herein by reference as a part of the present description.

BACKGROUND OF THE INVENTION

Field of the Invention

The present invention relates to a cationic polymerization initiator.

Background Art

A water-soluble initiator is always required in the emulsion polymerization method which is a general method for synthesizing a polymer particle emulsion. Of the water-soluble initiators, a cationic polymerization initiator is suitably used when an emulsion of cationic particles is synthesized. In particular, a cationic polymerization initiator having a quaternary ammonium structure has various advantages, for example, particles having an antibacterial function can be obtained.

WO 2017/043484 (Patent Literature 1) discloses a compound having a quaternary ammonium structure which functions as a cationic polymerization initiator, and also discloses that a polymer particle emulsion was synthesized by emulsion polymerization using the compound.

PRIOR ART DOCUMENT

Patent Document

Patent Document 1: WO2017/043484

SUMMARY OF THE INVENTION

As a result of study on properties of the cationic polymerization initiator mentioned in WO 2017/043484, it became apparent that the aggregation occurs in emulsion polymerization when using this polymerization initiator, thus making it difficult to synthesize an emulsion with a high solid component concentration.

As a result of intensive study to solve the above problems, the present inventors have found that, by limiting a counter ion (counter anion) in the cationic polymerization initiator mentioned in WO 2017/043484 to a specific type, an emulsion with a high solid component concentration can be obtained in a high yield with almost no aggregation in the emulsion polymerization. The present invention is based on this finding.

Therefore, the present invention provides a cationic polymerization initiator capable of reducing the amount of the aggregation formed in emulsion polymerization.

Thus, the present invention includes the following inventions.

(1) A compound having a chemical structure of the general formula (I):

[Chemical Formula 1]

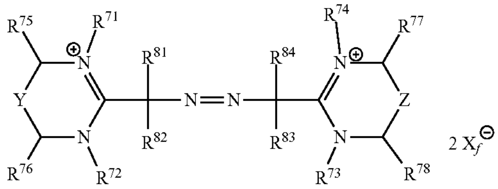

wherein

Y represents a single bond or $CHR^{85}$,

Z represents a single bond or $CHR^{86}$, $R^{72}$, $R^{73}$, $R^{75}$, $R^{76}$, $R^{77}$, $R^{78}$, $R^{85}$ and $R^{86}$ are each independently selected from the group consisting of a hydrogen atom, $C_{1-6}$ alkyl, $C_{1-6}$ alkoxy, $C_{1-6}$ alkylcarbonyl, phenyl and hydroxy, in which $C_{1-6}$ alkyl, $C_{1-6}$ alkoxy, $C_{1-6}$ alkylcarbonyl and phenyl may be further substituted with one or two substituents selected from the group consisting of $C_{1-6}$ alkyl, $C_{1-6}$ alkoxy, $C_{1-6}$ alkylcarbonyl, phenyl and hydroxy, $R^{72}$ and $R^{73}$ each independently represent, adamantyl, or $C_{1-6}$ alkyl substituted with $Si(OCH_3)_2(CH_3)$, or $R^{75}$ and $R^{76}$, or $R^{77}$ and $R^{78}$ may be combined to form $—(CH_2)_{3-5}—$, $R^{81}$, $R^{82}$, $R^{83}$ and $R^{84}$ are substituents selected from the group consisting of $C_{1-4}$ alkyl, $C_{1-4}$ alkylcarbonyl, and $C_{1-3}$ alkoxy, in which the $C_{1-4}$ alkyl may be substituted with one $C_{1-3}$ alkoxy group, $R^{71}$ and $R^{74}$ are each independently a $C_{1-3}$ alkyl group, and $X_f^-$ is a counter anion selected from the group consisting of $Cl^-$, $NO_3^-$, $Br^-$, $I^-$, $CH_3SO_3^-$ and $OH^-$.

(2) The compound according to (1), wherein $X_f^-$ is a counter anion selected from the group consisting of $Cl^-$, $NO_3^-$, $Br^-$, $I^-$ and $CH_3SO_3^-$, (3) The compound according to (1), wherein $X_f^-$ is $Cl^-$.

(4) The compound according to any one of (1) to (3), wherein Y and Z represent a single bond.

(5) The compound according to any one of (1) to (4), wherein $R^{81}$, $R^{82}$, $R^{83}$ and $R^{84}$ are each independently selected from the group consisting of methyl, ethyl, methylcarbonyl, isobutyl and 2-methyl-2-methoxy-propyl.

(6) The compound according to any one of (1) to (5), wherein $R^{71}$ and $R^{74}$ are methyl groups.

(7) The compound according to any one of (1) to (6), wherein $R^{72}$ and $R^{73}$, $R^{75}$ and $R^{77}$, $R^{76}$ and $R^{78}$, $R^{81}$ and $R^{84}$, $R^{82}$ and $R^{83}$, and $R^{71}$ and $R^{74}$ each represent the same substituent, and Y and Z represent the same substituent or both represent a single bond.

(8) The compound according to any one of (1) to (3), wherein $R^{71}$, $R^{72}$, $R^{73}$, $R^{74}$, $R^{81}$, $R^{82}$, $R^{83}$ and $R^{84}$ are methyl groups, $R^{75}$, $R^{76}$, $R^{77}$ and $R^{78}$ are hydrogen atoms, and Y and Z are single bonds.

(9) A cationic polymerization initiator including the compound according to any one of (1) to (8).

(10) A method for producing a polymer particle emulsion, which includes performing an emulsion polymerization reaction by the cationic polymerization initiator according to (9) and a monomer having a carbon-carbon double bond.

(11) A polymer particle emulsion obtained by the method according to (10).

According to the present invention, the aggregation in emulsion polymerization is reduced, thus making it possible to obtain a polymer particle emulsion with a high solid component concentration in a high yield.

DETAILED DESCRIPTION OF THE INVENTION

As used herein, "$C_{1-3}$ alkyl" means a linear, branched or cyclic alkyl group having 1 to 3 carbon atoms, and includes methyl, ethyl, n-propyl, i-propyl and cyclopropyl.

As used herein, "$C_{1-4}$ alkyl" means a linear, branched, cyclic or partially cyclic alkyl group having 1 to 4 carbon atoms, and includes, for example, methyl, ethyl, n-propyl, i-propyl, n-butyl, s-butyl, i-butyl, t-butyl, cyclopropyl, cyclobutyl and the like, and also includes, for example, $C_{1-3}$ alkyl or the like.

As used herein, "$C_{1-6}$ alkyl" means a linear, branched, cyclic or partially cyclic alkyl group having 1 to 6 carbon atoms, and includes, for example, methyl, ethyl, n-propyl, i-propyl, n-butyl, s-butyl, i-butyl, t-butyl, n-pentyl, 3-methylbutyl, 2-methylbutyl, 1-methylbutyl, 1-ethylpropyl, n-hexyl, 4-methylpentyl, 3-methylpentyl, 2-methylpentyl, 1-methylpentyl, 3-ethylbutyl, and 2-ethylbutyl, cyclopropyl, cyclobutyl, cyclopentyl, cyclohexyl and cyclopropylmethyl, and also includes, for example, $C_{1-4}$ alkyl and $C_{1-3}$ alkyl.

As used herein, "$C_{1-3}$ alkoxy" means an alkyloxy group having, as an alkyl moiety, the alkyl group having 1 to 3 carbon atoms which has already been defined, and includes, for example, methoxy, ethoxy, n-propoxy, i-propoxy and the like, and also includes, for example, $C_{1-4}$ alkoxy and $C_{1-3}$ alkoxy.

As used herein, "$C_{1-6}$ alkoxy" means an alkyloxy group having, as an alkyl moiety, the alkyl group having 1 to 6 carbon atoms which has already been defined, and includes, for example, methoxy, ethoxy, n-propoxy, i-propoxy, n-butoxy, s-butoxy, i-butoxy, t-butoxy, n-pentoxy, 3-methylbutoxy, 2-methylbutoxy, 1-methylbutoxy, 1-ethylpropoxy, n-hexyloxy, 4-methylpentoxy, 3-methylpentoxy, 2-methylpentoxy, 1-methylpentoxy, 3-ethylbutoxy, cyclopentyloxy, cyclohexyloxy, cyclopropylmethyloxy and the like, and also includes, for example, $C_{1-4}$ alkoxy and $C_{1-3}$ alkoxy.

As used herein, examples of the halogen atom include a fluorine atom, a chlorine atom, a bromine atom and an iodine atom.

As used herein, "$C_{1-4}$ alkylcarbonyl" represents a group $-CO(C_{1-4}$ alkyl), in which the $C_{1-4}$ alkyl is as already defined above.

As used herein, "$C_{1-6}$ alkylcarbonyl" represents a group $-CO(C_{1-6}$ alkyl), in which the $C_{1-6}$ alkyl is as already defined above.

As used herein, the copolymer is an aggregate of polymer chains formed by mixing monomers corresponding to each unit and performing a polymerization reaction. The polymer means a polymer chain in which monomer units are bonded and connected.

The compound of the present invention has a chemical structure of the general formula (I):

[Chemical Formula 2]

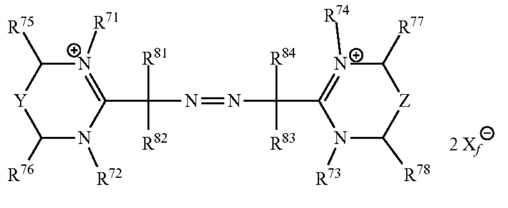

wherein

Y represents a single bond or $CHR^{85}$,

Z represents a single bond or $CHR^{86}$, $R^{72}$, $R^{73}$, $R^{75}$, $R^{76}$, $R^{77}$, $R^{78}$, $R^{85}$ and $R^{86}$ are each independently selected from the group consisting of a hydrogen atom, $C_{1-6}$ alkyl, $C_{1-6}$ alkoxy, $C_{1-6}$ alkylcarbonyl, phenyl and hydroxy, in which $C_{1-6}$ alkyl, $C_{1-6}$ alkoxy, $C_{1-6}$ alkylcarbonyl and phenyl may be further substituted with one or two substituents selected from the group consisting of $C_{1-6}$ alkyl, $C_{1-6}$ alkoxy, $C_{1-6}$ alkylcarbonyl, phenyl and hydroxy, $R^{72}$ and $R^{73}$ each independently represent, adamantyl, or $C_{1-6}$ alkyl substituted with $Si(OCH_3)_2(CH_3)$, or $R^{75}$ and $R^{76}$, or $R^{77}$ and $R^{78}$ may be combined to form $-(CH_2)_{3-5}-$, $R^{81}$, $R^{82}$, $R^{83}$, and $R^{84}$ are substituents selected from the group consisting of $C_{1-4}$ alkyl, $C_{1-4}$ alkylcarbonyl, and $C_{1-3}$ alkoxy, in which the $C_{1-4}$ alkyl may be substituted with one $C_{1-3}$ alkoxy group, $R^{71}$ and $R^{74}$ are each independently a $C_{1-3}$ alkyl group, and $X_f^-$ is a counter anion selected from the group consisting of $Cl^-$, $NO_3^-$, $Br^-$, $I^-$, $CH_3SO_3^-$ and $OH^-$.

According to a preferred embodiment of the present invention, $X_f^-$ is selected from the group consisting of $Cl^-$, $NO_3^-$, $Br^-$, $I^-$ and $CH_3SO_3^-$, and is more preferably $Cl^-$.

In one embodiment of the present invention, Y and Z of formula (I) represent a single bond.

In one embodiment of the present invention, $R^{81}$, $R^{82}$, $R^{83}$ and $R^{84}$ of formula (I) are each independently selected from the group consisting of methyl, ethyl, methylcarbonyl, isobutyl and 2-methyl-2-methoxy-propyl.

In one embodiment of the present invention, $R^{71}$ and $R^{74}$ of formula (I) are methyl groups.

In one embodiment of the present invention, $R^{72}$, $R^{73}$, $R^{75}$, $R^{76}$, $R^{77}$, $R^{78}$, $R^{85}$ and $R^{86}$ of formula (I) are each independently selected from the group consisting of a hydrogen atom, $C_{1-6}$ alkyl, $C_{1-6}$ alkoxy, $C_{1-6}$ alkylcarbonyl, phenyl and hydroxy.

In one embodiment of the present invention, $R^{75}$ and $R^{76}$, or $R^{77}$ and $R^{78}$ of formula (I) are combined to form $-(CH_2)_4-$.

According to a preferred embodiment of the present invention, $R^{72}$ and $R^{73}$, $R^{75}$ and $R^{77}$, $R^{76}$ and $R^{78}$, $R^{81}$ and $R^{84}$, $R^{82}$ and $R^{83}$, and $R^{71}$ and $R^{74}$ of formula (I) each represent the same substituent, and Y and Z represent the same substituent, or both represent a single bond.

According to a more preferred embodiment of the present invention the present invention, $R^{71}$, $R^{72}$, $R^{73}$, $R^{74}$, $R^{81}$, $R^{82}$, $R^{83}$ and $R^{84}$ of formula (I) are methyl groups, $R^{75}$, $R^{76}$, $R^{77}$ and $R^{78}$ are hydrogen atoms, and Y and Z are single bonds.

The compound of formula (I) can be synthesized according to the method mentioned, for example, in WO 2017/043484. The counter anion can be exchanged, for example, by passing a silica-based anion-exchange column in methanol.

The compound of the present invention can be used as a cationic polymerization initiator in the production of a polymer by radical polymerization. In particular, the cationic polymerization initiator of the present invention reduces the aggregation of polymer particles in the production of a polymer particle emulsion by emulsion polymerization, thus making it possible to produce a polymer particle emulsion in a high yield.

The amount of the polymerization initiator used can be selected as appropriate within the range of the concentration at which the polymerization reaction proceeds, and is not particularly limited, and the polymerization initiator can be used in the amount of, for example, 0.01 mol % or more, preferably 0.1 mol % or more, and still more preferably 0.5 mol % or more, relative to the monomer used.

As the monomer which is a raw material of the polymerization reaction, any compound having a carbon-carbon double bond can be used. In particular, the present invention has an advantage that the aggregation of the polymer is less likely to occur even when a polymer which is hardly soluble in water is synthesized in emulsion polymerization, and an emulsion with a high polymer concentration can be synthesized. Therefore, in one preferred embodiment of the present invention, the monomer is a monomer used for emulsion polymerization using water as a solvent. Examples of such a monomer include methacrylate, acrylate, styrene, a styrene derivative, vinyl acetate and the like, and examples of the most general-purpose monomer include methyl methacrylate (MMA) and styrene.

Further, a crosslinking agent can also be used in the polymerization reaction. The crosslinking agent is not particularly limited as long as it is a monomer having two or more vinyl groups in the molecule and is usually used as the crosslinking agent. Specific examples of the crosslinking agent include N,N'-methylenebisacrylamide, N,N'-ethylenebisacrylamide, N,N'-methylenebismethacrylamide, N,N'-ethylenebismethacrylamide, ethylene glycol diacrylate, ethylene glycol dimethacrylate and the like.

Examples of the reaction solvent used in the polymerization reaction include, but are not particularly limited to, water, ethanol, acetone, dioxane, dimethylformamide, dimethyl sulfoxide, and any mixture thereof. According to a preferred embodiment of the present invention, the reaction solvent is a mixture of ethanol and water, or a mixture of acetone and water.

The temperature and the time of the polymerization reaction are not particularly limited, and the polymerization reaction can be performed at a reaction temperature of, for example, 0 to 100° C., and preferably 50 to 80° C. for a reaction time of, for example, 1 to 48 hours, preferably 1 to 16 hours, and more preferably 1 to 10 hours.

EXAMPLES

Hereinafter, the present invention will be described in more detail by showing examples, but the present invention is not limited to these examples.

A cationic polymerization initiator, 2,2'-azobis-(2-(1,3-dimethyl-4,5-dihydro-1H-imidazol-3-ium-2-yl))propane triflate (ADIP) was synthesized according to the method mentioned in WO 2017/043484.

The diameter of the synthesized particles is a hydrodynamic particle diameter (Z-Ave) measured by Zetasizer Nano ZSP (Malvern Panalytical Ltd.) using the dynamic light scattering method. Further, PdI represents a polydispersity index and can evaluate the width of the particle diameter distribution. Distribution having a PdI value of 0.1 or less is commonly referred to as monodisperse, while a dispersion having a value between 0.1 and 0.3 is considered to have narrow diameter distribution. The zeta potential was measured by the Zetasizer Nano ZSP (Malvern Panalytical Ltd.).

Example 1: Inhibitory Effect of Emulsion Polymerization Caused by Counter Ion (Verification of Problem)

Ultrapure water and acetone were purged with nitrogen. In a vial (30 mL volume), methyl methacrylate (MMA) with a final concentration of 280 mM, ethylene glycol dimethacrylate (EGDMA) with a final concentration of 1.68 mM, and a polymerization initiator with a final concentration of 4.4 mM: 2,2'-azobis[2-(2-imidazolin-2-yl)propane] dihydrochloride (abbreviated to VA-044, CAS RN. 27776-21-2) were added, and then water and acetone were added until the final volume became 30 mL so as to have the acetone concentration of 40 v/v %. Further, a salt with a final concentration of 8.8 mM (shown in the table below) was added to each sample, and after closing a cap of the vial, the polymerization reaction was performed at 75° C. for 3 hours while stirring with a stirrer.

The diameter of particles of the emulsion synthesized by adding each salt, the degree of polydispersity, and the results of the presence or absence of the aggregation (sedimentation) are shown in Table 1. It was found that a sulfate ion (OG606, $SO_4^{2-}$) among the counter anions that are divalent anions, and a triflate ion (OG602, $CF_3SO_3^-$) among the counter anions that are monovalent anions of these salts cause the aggregation as compared with the case where no salt is added (OG598). The salt concentration of 8.8 mM is low concentration at which no aggregation is observed in the case of other monovalent counter anions $Cl^-$ (OG604), $Br^-$ (OG605), and $NO_3^-$ (OG607). Although the divalent ion is known to be easily aggregated by the DVLO theory, it was found that the triflate ion is present as the ion which aggregates at a low concentration even if it is a monovalent anion.

TABLE 1

Diameter of particles, degree of polydispersity, and presence or absence of aggregation (sedimentation) of each sample

| Sample | OG598 | OG604 | OG605 | OG606 | OG607 | OG602 |
|---|---|---|---|---|---|---|
| Salt added | — | KCl | NaBr | $Na_2SO_4$ | $KNO_3$ | $KCF_3SO_3$ |
| Diameter (nm) | 31 | 35 | 43 | 2671 | 75 | 1248 |
| PdI | 0.16 | 0.14 | 0.11 | 0.12 | 0.1 | 0.42 |
| Presence or absence of aggregation | None | None | None | Existence | None | Existence |

Example 2: Synthesis of Cationic Polymerization Initiator (Compound of Formula (I)) in Which Counter Anion is Exchanged ADIP was dissolved in methanol cooled to −20° C. to fabricate a 50 mg/mL ADIP solution. An InertSep SAX2 column (5 g of a filler, supported amount of 0.3 meq/g, preconditioned with 15 mL of MeOH) was filled with 6 mL of an ADIP solution and treated with 300 mg of ADIP. Next, 6 mL of ice-cooled MeOH was added in the column to obtain a total of 12 mL of a flow-through fraction. By repeating this, a total of 15 g of ADIP was treated. Drying was performed under reduced pressure while cooling at 5° C. to finally obtain 8.67 g of powder ADIP-Cl. The substitution of the counter anion of ADIP-Cl from the triflate ion to the chloride ion was confirmed by the qualitative analysis of the triflate ion by LC-MS and the quantitative determination of the chloride ion by the silver nitrate colorimetric method.

ADIP-Cl in which the counter anion was substituted with the chloride ion from the triflate ion could be synthesized in a yield of 100%. Further, as a result of the measurement of the decomposition activity of the azo group using the absorbance (375 nm) as an index, the decomposition rate of ADIP at 70° C. was $12.6\times10^{-4}$ (/s), and the decomposition rate of ADIP-Cl at 70° C. was $9.4\times10^{-4}$ (/s), and even if the counter anion was exchanged, there was no difference in decomposition rate which is one of abilities of the initiator.

Example 3: Synthesis Method of Stable Cationic PMMA Emulsion by Using ADIP-Cl Ultrapure water and acetone were purged with nitrogen. In a vial (30 mL volume), methyl methacrylate (MMA) with a final concentration of 470 mM, ethylene glycol dimethacrylate (EGDMA) with a final concentration of 2.82 mM, and a polymerization initiator with a final concentration of 4.4 mM: VA-044, 2,2'-azobis(2-methylpropionamidine) dihydrochloride (abbreviated to V-50, CAS RN. 2997-92-4), ADIP or ADIP-Cl synthesized in Example 2 were added, and then water and acetone were added until the final volume became 30 mL so as to have the acetone concentration of 40 v/v %. After closing a cap of the vial, the polymerization reaction was performed at 75° C. for 3 hours while stirring with a stirrer.

The synthesis results are shown in Table 2. It was found that only ADIP causes the aggregation. ADIP contains the triflate ion with a concentration equivalent to 8.8 mM, which is the same concentration as the salt used in Example 1. No aggregation was observed in OG825 in which the triflate ion was substituted with the chloride ion, so that it was found that a stable emulsion could be synthesized by using a cationic polymerization initiator having no triflate ion. The diameter of OG825 was 125 nm, PdI was 0.102, and the zeta potential was 60 mV, thus finding that cationic particles could be synthesized.

TABLE 2

Polymerization conditions, and presence or absence of aggregation of each sample

| Sample | OG563 | OG599 | OG565 | OG825 |
|---|---|---|---|---|
| MMA (mM) | 470 | 470 | 470 | 470 |
| EGDMA (mM) | 2.82 | 2.82 | 2.82 | 2.82 |
| Initiator (4.4 mM) | V-50 | VA-044 | ADIP | ADIP-CI |
| Reaction temperature (° C.) | 75 | 75 | 75 | 75 |
| Presence or absence of aggregation of synthesized solution | None | None | Existence | None |

Example 4: Synthesis of High-Concentration Polystyrene (PS) Emulsion Using ADIP-Cl All ultrapure water was used after purging dissolved oxygen for 30 minutes or more by nitrogen bubbling while stirring with a stirrer. In a 30 mL transparent vial, 12 mL of ethanol was added. After adding 3.45 mL of styrene in the vial so that the monomer concentration became a final concentration of 1,000 mM, a polymerization initiator ADIP or ADIP-Cl dissolved in 1 mL of ultrapure water was added in the vial so that the final concentration became 10 mM. After adding ultrapure water to adjust the total volume to 30 mL, the vial was set in a hot water bath at 60° C. and then the mixture was stirred with a strong stirrer (1-6618-02, magnetic stir bar, φ4.5×12 mm) and synthesized for a total of 6 hours.

The synthesis results are shown in Table 3. When using ADIP (OG919), the yield was as low as 10%, and PdI was extremely high as 0.49, which tended to aggregate. Meanwhile, when synthesized with ADIP-Cl in which the triflate ion was substituted with the chloride ion (YT010), it was found that the yield is improved to 62% and an extremely monodisperse and stable particle suspension having a diameter of about 200 nm can be synthesized. The results and the results of Example 3 revealed that ADIP-Cl in which the triflate ion was substituted is useful for fabricating a cationic polymer particle suspension in the synthesis of typical polymer emulsions such as PMMA and PS.

TABLE 3

Polymerization conditions, yield and characteristics of each sample

| Sample | OG919 | YT010 |
|---|---|---|
| Styrene (mM) | 1000 | 1000 |
| Initiator (10 mM) | ADIP | ADIP-Cl |
| Yield (%) | 10 | 62 |
| Diameter (nm) | 1290 | 196 |
| PdI | 0.49 | 0.06 |

Example 5: Aggregation Effect of Methyl Polymethacrylate (PMMA) Particles and Polystyrene (PS) Particles by Counter Ion In order to investigate the precipitation behavior of particles to various salts, a PMMA particle suspension OG1024 was synthesized. Specifically, the synthesis was performed according to the following procedure. First, ultrapure water was purged with nitrogen. In a vial (30 mL volume), methyl methacrylate with a final concentration of 1,000 mM and a polymerization initiator with a final concentration of 2 mM: 2,2'-azobis(2-methylpropionamidine) dihydrochloride (abbreviated to V-50, CAS RN. 2997-92-4) was added, and then water was added until the final volume became 30 mL. After closing a cap of the vial, the polymerization reaction was performed at 60° C. for 16 hours while stirring with a stirrer. The sample cooled to room temperature was vacuum-dried to calculate the particle solid component concentration. The particle solid component concentration was adjusted to 0.14 mg/ml and the concentration of each salt added was adjusted to 7.5 mM, followed by cap closing and further mixing with a vortex mixer to prepare a sample for DLS measurement.

Similarly, in order to investigate the precipitation behavior of particles to various salts, a PS particle suspension YT085 was synthesized. Specifically, the synthesis was performed according to the following procedure. First, ultrapure water was purged with nitrogen. In a vial (30 mL volume), styrene with a final concentration of 1,000 mM and a polymerization initiator V-50 with a final concentration of 10 mM were added, and then an aqueous 30 v/v % ethanol solution was added until the final volume became 30 mL. After closing a cap of the vial, the polymerization reaction was performed at 80° C. for 6 hours while stirring with a stirrer. The sample cooled to room temperature was vacuum-dried to calculate the particle solid component concentration. The particle solid component concentration was adjusted to 0.14 mg/ml and the concentration of each salt added was adjusted to 50 mM, followed by cap closing and further mixing with a vortex mixer to prepare a sample for DLS measurement.

The results of the diameter and the degree of polydispersity after adding each salt to the synthesized emulsion particles are shown in Tables 4 and 5, respectively. The diameter of PMMA particles (OG1024) without adding a salt was 382 nm, while the diameter was increased to 1,169 nm and 740 nm (Table 4), respectively, due to the addition of a sulfate ion ($SO_4^{2-}$) which counter anion is a divalent anion and a triflate ion ($CF_3SO_3^-$) which counter anion is a monovalent anion. Due to the addition of the triflate ion, PdI was extremely large at 0.58, which tended to aggregate. Similarly, the diameter of PS particles (YT085) was 356 nm, while the diameter was increased to 1,529 nm for the sulfate ion and 2,544 nm for the triflate ion due to the addition of the above two anions. Due to the addition of the triflate ion, PdI was extremely large at 0.50, which tended to aggregate (Table 5). Meanwhile, due to the addition of $Cl^-$, $Br^-$, $I^-$, $NO_3^-$ or $CH_3SO_3^-$, the diameters of OG1024 and YT085 did not significantly change as compared with the above two anions. The above results revealed that the divalent ion and the monovalent triflate ion cause the aggregation even in the particles synthesized by emulsion polymerization, as in Example 1. From these results, in order to avoid the aggregation of emulsion particles, it is desirable to select one of, $Cl^-$, $Br^-$, $I^-$, $NO_3^-$ and $CH_3SO_3^-$ as the counter anion of the polymerization initiator.

TABLE 4

Diameter and degree of polydispersity of PMMA particles (OG1024) added to each potassium salt solution

| Salt added | None | KCl | KBr | KI | $KNO_3$ | $KCH_3SO_3$ | $KCF_3SO_3$ | $K_2SO_4$ |
|---|---|---|---|---|---|---|---|---|
| Diameter (nm) | 382 | 378 | 417 | 424 | 422 | 366 | 1169 | 740 |
| Pdl | 0.23 | 0.25 | 0.29 | 0.28 | 0.31 | 0.21 | 0.58 | 0.43 |

TABLE 5

Diameter and degree of polydispersity of PS particles (YT085) added to each potassium salt solution

| Salt added | None | KCl | KBr | KI | $KNO_3$ | $KCH_3SO_3$ | $KCF_3SO_3$ | $K_2SO_4$ |
|---|---|---|---|---|---|---|---|---|
| Diameter (nm) | 356 | 347 | 348 | 415 | 387 | 355 | 2544 | 1529 |
| Pdl | 0.07 | 0.06 | 0.07 | 0.11 | 0.10 | 0.06 | 0.50 | 0.14 |

The invention claimed is:

1. A compound having a chemical structure of the general formula (I):

[Chemical Formula 1]

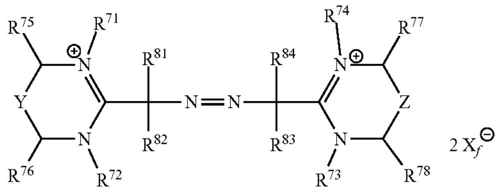

wherein

Y represents a single bond,

Z represents a single bond, $R^{71}$, $R^{72}$, $R^{73}$, $R^{74}$, $R^{81}$, $R^{82}$, $R^{83}$ and $R^{84}$ are methyl groups, and $R^{75}$, $R^{76}$, $R^{77}$ and $R^{78}$ are hydrogen atoms, and $X_f^-$ is $Cl^-$.

2. A cationic polymerization initiator comprising the compound according to claim 1.

3. A method for producing a polymer particle emulsion, which comprises performing an emulsion polymerization reaction by the cationic polymerization initiator according to claim 2 and a monomer having a carbon-carbon double bond.

* * * * *